United States Patent [19]

Fleischer et al.

[11] Patent Number: 4,481,333

[45] Date of Patent: Nov. 6, 1984

[54] THERMOPLASTIC COMPOSITIONS COMPRISING VINYL CHLORIDE POLYMER, CLPE AND FLUOROPOLYMER

[75] Inventors: Dietrich Fleischer, Darmstadt; Eckhard Weber, Liederbach; Johannes Brandrup, Wiesbaden, all of Fed. Rep. of Germany

[73] Assignee: Hoechst Aktiengesellschaft, Fed. Rep. of Germany

[21] Appl. No.: 566,207

[22] Filed: Dec. 28, 1983

[30] Foreign Application Priority Data

Dec. 31, 1982 [DE] Fed. Rep. of Germany ....... 3248731

[51] Int. Cl.³ .................... C08L 23/28; C08L 27/06; C08L 27/18
[52] U.S. Cl. .................................. 525/192; 525/199; 525/239

[58] Field of Search ............................. 525/192, 199

[56] References Cited

U.S. PATENT DOCUMENTS

| | | | |
|---|---|---|---|
| 3,005,795 | 10/1961 | Busse et al. ......................... | 525/199 |
| 3,294,871 | 12/1966 | Schmitt et al. .................. | 525/154 X |
| 3,299,182 | 1/1967 | Jennings et al. ..................... | 525/192 |
| 3,334,157 | 8/1967 | Larsen ................................. | 525/199 |
| 3,940,456 | 2/1976 | Fey et al. ............................. | 525/192 |

*Primary Examiner*—Carman J. Seccuro
*Attorney, Agent, or Firm*—Connolly & Hutz

[57] ABSTRACT

The invention relates to a thermoplastic composition which comprises vinyl chloride polymers and chlorinated polyethylene and which contains finely divided fluoropolymers and has a markedly improved processability, particularly when shaped by extrusion.

7 Claims, No Drawings

THERMOPLASTIC COMPOSITIONS COMPRISING VINYL CHLORIDE POLYMER, CLPE AND FLUOROPOLYMER

It is known that fluoropolymers and, in particular, polytetrafluoroethylene, have a very low coefficient of sliding friction and are therefore recommended as an additive for other plastics in quantities of 10–30 parts by weight, in order to exert an advantageous effect on the anti-friction properties of articles molded from these plastics. In this case the fluoropolymer (polytetrafluoroethylene) is employed as a filler.

Thus German Auslegeschrift No. 1,286,302 describes the addition of polytetrafluoroethylene to other organic polymers including also polyvinyl chloride (PVC), in order to control the processing properties and the melt viscosity of these polymers. According to the teaching of this German Auslegeschrift, it is essential for this that the polytetrafluoroethylene should be in a micro-fibrous or submicro-fibrous form and that, after being mixed with a polymer, the bulk of the polytetrafluoroethylene particles should have a diameter below the resolving power of an optical microscope. A further requirement for the use of polytetrafluoroethylene particles in accordance with this publication is that the polytetrafluoroethylene particles must be capable of adhering to one another and of forming a coherent composition. Polyethylene particles which do not adhere to one another are, therefore, not suitable. The prescribed fine dispersion of the polytetrafluoroethylene is effected by intensively grinding the polymer, mixed with polytetrafluoroethylene, in a fusible state and, for this reason alone, would be completely unsuitable for the technique of preparing PVC dry blends.

It is stated in German Offenlegungsschrift No. 1,694,338 that the processing properties of PVC are improved by enveloping the individual particles of the pulverulent PVC with selected polymer coatings. Coating polymers which are preferred in this respect are fluorocarbon polymers. The PVC particles are enveloped by coating them with a fluorine-containing monomer which is then polymerized in a suitable manner, for example by means of organic peroxides.

A procedure of this type for improving the processing properties of PVC is very tedious and expensive and conflicts with the practical use of fluorocarbon polymers for this purpose, especially since tetrafluoroethylene, which has a boiling point of $-76°$ C., cannot, in accordance with the teaching of this German Offenlegungsschrift, be polymerized in an aqueous dispersion to form a polymeric coating without the use of pressure.

There has also been no lack of attempts to improve the processing properties of high impact strength PVC compositions, which are difficult to process, by adding lubricants, for example metal stearates, polyethylene waxes, fatty acid esters and the like or other additives. As well as being only moderately successful, additives of this type often exhibit undesirable side effects which manifest themselves, for example, in surface markings of the visual surface of extruded sections, and tend under certain circumstances to exude (plate out) or impair the plasticization process. This also applies to attempts to improve the processing properties of PVC/CPE mixtures by adding finely divided polytetrafluoroethylene to these mixtures. The results fall more or less within the range of results achieved by other processing auxiliaries and do not provide a solution to the present problem.

The object of the invention was, therefore, to avoid, completely or substantially, the disadvantages described above and, in particular, to provide a thermoplastic composition based on vinyl chloride polymers and chlorinated low-pressure polyethylene which has improved processing properties, in particular when shaped by extrusion, and which can also be prepared in a simple manner.

It has now been found that the desired objective can be achieved in a surprisingly simple manner if the chlorinated polyethylene is first mixed, on its own, with a fluoropolymer, or—which is less preferable—if the chlorination of the polyethylene for the preparation of the chlorinated polyethylene is already effected in the presence of a fluoropolymer and the chlorinated polyethylene thus obtained is then mixed with the vinyl chloride polymer.

The invention therefore relates to a thermoplastic composition composed essentially of:

(A) 97 to 80% by weight of a vinyl chloride polymer and (B) 3 to 20% by weight of a chlorinated low-pressure polyethylene, wherein, before the components (A) and (B) are mixed, the component (B) is mixed with 0.01 to 2.0% by weight, relative to the chlorinated low-pressure polyethylene, of a finely divided fluoropolymer.

The invention also relates to a thermoplastic composition composed essentially of:

(A) 97 to 80% by weight of a vinyl chloride polymer and (B) 3 to 20% by weight of a chlorinated low-pressure polyethylene, wherein a chlorinated low-pressure polyethylene which has been prepared by chlorinating low-pressure polyethylene in an aqueous or aqueous hydrochloric acid suspension is used, and wherein 0.01 to 2.0% by weight, relative to polyethylene, of a finely divided fluoropolymer have been added to the chlorination liquor, excluding chlorinated low-pressure polyethylenes which are obtained by chlorinating low-pressure polyethylene in the presence of 0.3 to 1.5% by weight of a polytetrafluoroethylene wax having a molecular weight of $10^4$ to $10^6$ and a particle size of 0.1 to 10.0 $\mu$m and, additionally also 0.01 to 1.1% by weight of silica which has been rendered hydrophobic and has a particle size of about 7 to 18 nm and 0.5 to 3.5% by weight of an inert inorganic additive which has a high absorptive capacity for low-pressure polyethylene.

In accordance with the invention it is possible, in principle, to employ the known fluoropolymers according to employ the known fluoropolymers according to the state of the art, but the latter should preferably already be in an appropriately finely divided state and should have an average particle size within the range from 0.05 to 50 $\mu$m, preferably 0.1 to 10 $\mu$m. The fluoropolymer can be used here either in the form of powder or in the form of dispersions; in the latter case the dispersion medium is preferably an organic liquid which is readily compatible with PVC and chlorinated polyethylene, such as, for example, an aqueous solution of the ammonium salt of perfluorooctoic acid or, for instance, dioctyl phthalate and the like. Dispersions of this type can have a fluoropolymer content (relative to the total dispersion) of 10 to 50% by weight, preferably 15 to 25% by weight; the particle size is in most cases within the range from 0.1 to 10 $\mu$m, preferably 0.2 to 4 $\mu$m.

The term "fluoropolymers" is to be understood here as meaning polymers which preferably contain at least 50% by weight, in particular at least 70% by weight, relative to the polymer, of fluoroolefin units, and which have thermoplastic properties. Examples of fluoroolefins which may be mentioned here are tetrafluoroethylene, trifluorochloroethylene, vinyl fluoride and vinylidene fluoride, and examples of corresponding polymers are polytetrafluoroethylene, polytrifluoroethylene, polyvinyl fluoride and polyvinylidene fluoride, and also corresponding copolymers containing mixtures of such fluoroolefin units and/or units derived, for example, from hexafluoropropene or from olefins, such as ethylene, and from fluorinated ethers, in particular perfluoro(alkyl-vinyl) ethers, such as perfluoropropyl perfluorovinyl ether. Homopolymers and copolymers of this type are described, for example, in German Offenlegungsschrift No. 2,523,147.

In accordance with the invention the fluoropolymer is preferably a homopolymer of tetrafluoroethylene (PTFE, the melt viscosity of which is, in general, between approx. $0.7 \times 10^1$ and approx. $10^{11}$ Pa. seconds, preferably $10^2$ to $10^7$ Pa. seconds (at 380° C. and 200 kp/cm$^2$). It is also possible, however, to employ appropriate tetrafluoroethylene copolymers which have a thermoplastic character and which preferably contain at least 50% by weight, in particular at least 70% by weight, relative to the polymer, of tetrafluoroethylene units. Tetrafluoroethylene copolymers of this type are described, for example, in the abovementioned German Offenlegungsschrift No. 2,523,147.

The tetrafluoroethylene polymers which are particularly preferred in accordance with the invention constitute so-called fluorocarbon waxes, i.e. tetrafluoroethylene homopolymers or copolymers, the former being preferred, which have melt viscosities within the range from about $0.7 \times 10^1$ to about $1 \times 10^7$ Pa. seconds, preferably $10^2$ to $1.5 \times 10^3$ Pa. seconds (380° C. and 200 kp/cm$^2$). Fluorocarbon waxes of this type are described, for example, in German Auslegeschriftt No. 2,235,885 and in the literature quoted therein. Typical polytetrafluoroethylene waxes have, for example, the properties set out below:

Bulk density (g/liter): ~300 to ~450
Particle size ($\mu$m): ~0.1 to ~6
Density (g/cm$^3$): ~2.2
Specific surface area (m2/g): ~14 to ~5.0
Melting point (°C.): =327
Melt viscosity (Pa. seconds): ~$1.5 \times 10^3$ to ~$10^2$
Molecular weight: ~$3 \times 10^4$ to ~$2 \times 10^5$ The chlorinated polyethylene is generally mixed with the fluoropolymer at temperatures of 20° to 50° C., preferably 30° to 45° C., in mixing equipment customary for this purpose. If the fluoropolymer is employed in the form of powder, this mixing process if effected, for example, by initially taking the two components and then mixing them in an appropriate manner, the temperature of the material being mixed being kept within the temperature range mentioned above.

If the fluoropolymer is used in the form of a dispersion, this mixing process is effected in an analogous manner.

Instead of mixing or impregnating the finished chlorinated polyethylene with the fluoropolymer—the route preferred in accordance with the invention—it is also possible to absorb the fluoropolymer onto the polymer grain during the preparation of the chlorinated polyethylene. This is effected by adding the fluoropolymer, for example in the form of powder, to the aqueous or aqueous hydrochloric acid suspension during the chlorination reaction, which is carried out in the conventional manner.

The thermoplastic composition according to the invention contains 97 to 80% by weight, preferably 90 to 80% by weight, of polyvinyl chloride or a copolymer of vinyl chloride with other comonomers. The following are examples of possible comonomers: olefins, such as ethylene or propylene, vinyl esters of linear or branched carboxylic acids having 2 to 20, preferably 2 to 4, carbon atoms, such as vinyl acetate, propionate, butyrate, 2-ethylhexoate or stearate or vinyl isotridecanoate; vinyl halides, such as vinyl fluoride, vinylidene fluoride or vinylidene chloride; vinyl ethers, such as vinyl methyl ether; vinylpyridine; unsaturated acids, such as maleic, fumaric, acrylic or methacrylic acid and monoesters or diesters thereof with monoalcohols or dialcohols having 1 to 10 carbon atoms; maleic anhydride; maleimide and N-substitution products thereof containing aromatic, cycloaliphatic and, if appropriate, branched aliphatic substituents; acrylonitrile and styrene. It is also possible to employ mixtures of these monomers.

The amount of comonomer units in the VC copolymer can be up to 20% by weight; it is preferably 1 to 5% by weight. It is preferable to employ suspension PVC or mass-polymerized PVC.

The K-value of the VC polymer in the molding composition according to the invention is in most cases within the range from 30 to 80, preferably 50 to 75.

The chlorinated low-pressure polyethylene to be used in accordance with the invention, the amount of which in the molding composition is preferably 10 to 20% by weight, is finely divided and can be readily mixed with vinyl chloride polymer powders to give a homogeneous mixture.

As a rule, it has an average molecular weight $M_w$ of $1 \times 10^4$ to $12 \times 10^6$, preferably $6 \times 10^4$ to $5 \times 10^5$, a chlorine content of 10 to 50% by weight, preferably 25 to 45% by weight, a residual crystallinity of 0 to 40%, preferably 0 to 30% and especially 0 to 20%, measured by differential thermoanalysis, a swelling value (as specified in German Offenlegungsschrift No. 2,343,982) of 0.1 to 40%, in particular 0.1 to 1%, and a residual value (as specified in German Offenlegungsschrift No. 2,343,982) of 0 to 80% by weight, preferably 0 to 40% by weight. It also has a Shore A (DIN 53,505) surface hardness of 40° to 90°, preferably 45° to 70°. The average particle size of the chlorinated polyethylene powder is generally 250 to 500 $\mu$m, preferably 200 to 300 $\mu$m, and the particle size distribution is generally between 80% of material not exceeding 500 $\mu$m and not more than 10% of material less than 50 $\mu$m, preferably 80% of material not exceeding 400 $\mu$m and not more than 10% of material preferably smaller than 100 $\mu$m.

The chlorinated polyethylene which is employed in accordance with the invention is prepared in a known manner, i.e. for example, by chlorination in an aqueous suspension, in solution or in the gas phase as described, for instance, in German Offenlegungsschrift No. 2,913,855.

The molding compositions according to the invention can contain the customary additives, such as stabilizers, antioxidants, UV stabilizers, pigments, dyestuffs, fillers, processing auxiliaries and the like, such as are described, for example, in German Offenlegungsschrift No. 2,456,278, in U.S. Pat. No. 3,641,216 or in H. Kainer "Polyvinylchlorid und Vinylchlorid-Mischpolymerisate" ("Polyvinyl chloride and vinyl chloride copolymers"), Springer-Verlag, Berlin, Heidelberg, New York (1965), pages 209 to 258 and 275 to 329.

Depending on the proportion of chlorinated low-pressure polyethylenes, the thermoplastic composition according to the invention is suitable for sections, slabs, tubes, sheeting and other shaped articles, and can be processed very readily by the dry blend technique.

The examples below are intended to illustrate the invention in greater detail.

I. Preparation of the Molding Compositions

EXAMPLE 1 (COMPARISON)

The following molding composition was prepared as a dry blend in a conventional heating/cooling mixing apparatus using the procedure customary for rigid PVC:

90 parts by weight of suspension PVC (K-value 70)
10 parts by weight of chlorinated polyethylene (CPE; chlorine content approx. 35%)
2.0% by weight of barium/cadmium stabilizer (solid), (cadmium content at least 10%),
2% by weight of epoxidized soya bean oil,
0.5% by weight of an organic phosphite,
0.3% by weight of hydroxystearic acid,
0.2% by weight of a wax ester,
4% by weight of calcium carbonate and
4% by weight of titanium dioxide (rutile type).

The speed of rotation was 1,200 r.p.m. and the final temperature of the material being mixed was 115° C. All the solids in the above formulation—with the exception of titanium dioxide—were put in initially; the liquid constituents of the mixture were then added at 70° C. and the titanium dioxide was added at 90° C.

The processing behavior of the mixture thus obtained was then examined; cf. Tables 1 to 3 below.

EXAMPLE 2

(a) The finely divided PTFE was applied direct to the chlorinated polyethylene by adding 4 kg of chlorinated polyethylene according to Example 1 and 8 g of polytetrafluoroethylene wax (molecular weight approx $10^5$, melt viscosity $1.5 \times 10^3$ Pa.seconds) in the form of powder to a high-speed heating/cooling mixer combination. The contents of the mixer were then mixed for about 3 minutes at approx. 1,200 r.p.m. until the temperature had risen to not more than 45° C. A higher temperature would have resulted in agglomeration of the material being mixed. The material was then transferred to the cooling mixer and was mixed for a further 5 minutes at a slow speed of rotation of approx. 400 r.p.m. until the temperature had fallen to 30° C. The CPE prepared in this fashion was in the form of a free-flowing powder; its PTFE content, relative to CPE, was 0.2% by weight.

(b) 10 parts by weight of the CPE obtained above under (a) were then mixed, in the manner described in Example 1, with 90 parts by weight of suspension PVC (K-value 70) and with the further additives described in Example 1. The processing behavior of this mixture was then examined (cf. Tables 1 to 3 below).

Virtually the same results are obtained if a PTFE dispersion containing the ammonium salt of perfluorooctoic acid as a dispersing agent is employed instead of PTFE powder, or if a tetrafluoroethylene copolymer (for example a tetrafluoroethylene/ethylene copolymer) is used instead of PTFE. The same also applies to the replacement of PTFE by an appropriate polytrifluorochloroethylene or polyvinylidene fluoride.

EXAMPLE 3 (COMPARISON)

A molding composition was prepared in accordance with Example 1, with the difference that 0.02% by weight (relative to 100 parts by weight of the PVC/CPE mixture) of the polytetrafluoroethylene according to Example 2 was subsequently introduced into the finished PVC/CPE mixture.

EXAMPLE 4 (COMPARISON)

A molding composition was prepared in accordance with Example 3, with the difference that 0.2% by weight of the polytetrafluoroethylene according to Example 2 was additionally introduced into the finished PVC/CPE mixture.

EXAMPLE 5

A molding composition was prepared in accordance with Example 2, with the difference that the CPE now contained 0.5% by weight of polytetrafluoroethylene instead of 0.02% by weight.

EXAMPLE 6 (COMPARISON)

A molding composition was prepared in accordance with Example 3, with the difference that 0.05% by weight of the polytetrfluoroethylene according to Example 2 was subsequently introduced into the finished PVC/CPE mixture.

EXAMPLE 7 (COMPARISON)

A molding composition was prepared in accordance with Example 3, with the difference that 0.5% by weight of the polytetrafluoroethylene according to Example 2 was subsequently introduced into the finished PVC/CPE mixture.

EXAMPLE 8 (COMPARISON)

A molding composition was prepared in accordance with Example 1, with the difference that 0.5% by weight of calcium stearate was also added, as a generally known lubricant, to the finished PVC/CPE mixture.

II. Examination of Processing Behaviour

The PVC dry blend powder mixtures prepared in accordance with Examples 1 to 8 were processed on a contra-rotating twin screw extruder which is constructed in the form of a measuring extruder and which makes it possible to determine the melt pressures set up in the cylinder at various measuring points. The length of screw was approx. $18 \times D$ and the screw diameter D was 63 mm.

The die used was a spinneret, and the screw speed was 15 r.p.m.

Table 1 below lists the values measured, which provide information on the processing properties of each PVC mixture.

It can be seen, here, both from the values obtained for torque, current consumption and machine loading, and from the pressures within the cylinder, that the direct application of polytetrafluoroethylene to the CPE renders it appreciably easier to process the PVC/CPE mixtures.

found, as can be seen clearly from the increase in the torque and from the cylinder pressures.

TABLE 1

The effect of polytetrafluoroethylene (PTFE) on the processing conditions of PVC/CPE mixtures when extruded

| Example | | PTFE content in the PVC/CPE (%) | Torque (N.m) | Current consumption (A) | Power input (KW) | Pressure (bar) | | | |
|---|---|---|---|---|---|---|---|---|---|
| Example No. | Type of treatment | | | | | $P_1$ | $P_2$ | $P_3$ | $P_4$ |
| 1* | CPE without PTFE | 0 | 230 | 15 | 6 | 15 | 13 | 12 | 192 |
| 2 | 0.2% of PTFE, (applied direct to the CPE) | 0.02 | 205 | 13 | 4 | 12 | 12.5 | 10.5 | 170 |
| 3* | 0.2% of PTFE (to the PVC/CPE Blend) | 0.02 | 230 | 15 | 6 | 15 | 13.5 | 12 | 190 |
| 4* | 0.2% of PTFE (to the PVC/CPE Blend) | 0.2 | 208 | 12 | 5 | 15 | 12.5 | 10 | 160 |
| 5 | 0.5% of PTFE, (applied direct to CPE) | 0.05 | 210 | 12 | 4 | 13 | 12.5 | 10 | 184 |
| 6* | 0.05% of PTFE (to the PVC/CPE Blend) | 0.05 | 225 | 15 | 6 | 14.5 | 13 | 11 | 190 |
| 7* | 0.5% of PTFE (to the PVC/CPE Blend) | 0.5 | 205 | 12 | 2 | 12 | 13.5 | 10 | 156 |
| 8* | 0.5% of Calcium stearate (to the PVC/CPE Blend) | 0 | 240 | 15 | 6 | 16 | 14 | 12 | 205 |

*Comparison examples

In particular, the reduction in the torque and in the pressures $P_1$ to $P_4$ signifies easier flow and a lower loading of the machine units.

At the same polytetrafluoroethylene content, relative to the final mixture, the subsequent introduction of polytetrafluoroethylene into the PVC/CPE mixture does not produce the same effect. The values obtained are higher than when the polytetrafluoroethylene is applied direct to the CPE. Similar values are only obtained if the amounts of polytetrafluoroethylene in the mixture are approx. 10 times as high.

For comparison, a PVC/CPE mixture containing a lubricant with a typical internal action, such as, for example, calcium stearate, is also listed (Example 8). In this case a completely different processing behavior is found, as can be seen clearly from the increase in the torque and from the cylinder pressures.

In order to confirm the values obtained when processing the PVC/CPE blends on the measuring extruder under practical conditions, some of the mixtures described in the examples were examined on an extrusiometer equipped with a twin screw.

It can be seen from Table 2 below, that very small amounts of polytetrafluoroethylene, when applied direct to the CPE, reduce the torque and the material pressures more strongly than is the case if the same quantity of polytetrafluoroethylene is added subsequently to the PVC/CPE mixture.

A similar reduction in torque and pressure is only given by 10 times the quantity of polytetrafluoroethylene when the latter is added to the mixture, i.e. there is confirmation of the values listed in Table 1.

TABLE 2

The effect of polytetrafluoroethylene (PTFE) on the processing conditions of PVC/CPE mixtures on an extrusiometer equipped with a twin screw

| Example | | Effective PTFE content in the PVC/CPE (%) | Torque (N.m) | Material pressures (bar) | | |
|---|---|---|---|---|---|---|
| Example No. | Type of treatment | | | Measuring point 1 | Measuring point 2 | Measuring point 3 |
| 1* | CPE without PTFE | 0 | 255 | 18 | 213 | 178 |
| 2 | 0.2% of PTFE | 0.02 | 246 | 15 | 202 | 169 |
| 3* | 0.02% of PTFE (to the PVC/CPE Blend) | 0.02 | 253 | 18 | 212 | 178 |
| 4* | 0.2% of PTFE (to the PVC/CPE Blend) | 0.2 | 243 | 14 | 199 | 163 |
| 8* | 0.5% of calcium stearate (to the PVC/CPE Blend) | 0 | 260 | 18 | 215 | 185 |

*Comparison examples
Measuring point 1: before degassing
Measuring point 2: shortly before the tip of the screw (in the direction of the die)
Measuring point 3: in the connecting piece The effect of the polytetrafluoroethylene treatment of the CPE samples according to the examples on the notched impact strength of the PVC/CPE blends thus produced was tested by extruding, under practical conditions, window sections from the mixtures with and without polytetrafluoroethylene-treated CPE, from which sections test specimens as specified in DIN 53,453 were then prepared for testing the notched impact strength $a_K$.

It can be seen from Table 3 that the notched impact strength of sections prepared from CPE-modified PVC is not reduced by treating the CPE samples with polytetrafluoroethylene. Surprisingly, even higher values of notched impact strength are obtained by the polytetrafluoroethylene treatment of the CPE samples, since quite evidently the morphology of the PVC/CPE mixtures becomes more stable to shear as a result of the addition, according to the invention, of fluoropolymer.

TABLE 3

The effect of polytetrafluoroethylene (PTFE) on the notched impact strength of extruded PVC/CPE mixtures

| Material (90% of PVC (K-value 70)/ 10% of CPE) | $a_K$ (mJ/mm²) (maximum cylinder temperature = 170° C. | $a_K$ (mJ/mm²) (maximum cyclinder temperature = 180° C. |
|---|---|---|
| CPE (34% of Cl) | 21 | 11 |
| CPE (34% of Cl) +0.1% of PTFE | 27 | 14 |
| CPE (34% of Cl) +0.2% of PTFE | 33 | 13 |

We claim:

1. A thermoplastic composition consisting essentially of (A) 97 to 80% by weight of a vinyl chloride polymer and (B) 3 to 20% by weight of a chlorinated low-pressure polyethylene, wherein, before the components (A) and (B) are mixed, the component (B) is mixed with 0.01 to 2.0% by weight, relative to the chlorinated low-pressure polyethylene, of a finely divided fluoropolymer.

2. A thermoplastic composition as claimed in claim 1, wherein the finely divided fluoropolymer is mixed in the form of powder or as a liquid dispersion with the component (B).

3. A thermoplastic composition as claimed in claim 1, wherein the fluoropolymer is a polytetrafluoroethylene wax having a melt viscosity of $10^2$ to $1.5 \times 10^3$ Pa.-seconds (at 380° C. and 200 kp/cm² load).

4. A thermoplastic composition as claimed in claim 1, wherein the particle size of the fluoropolymer is 0.1 to 10 μm.

5. A thermoplastic composition consisting essentially of (A) 97 to 80% by weight of a vinyl chloride polymer and (B) 3 to 20% by weight of a chlorinated low-pressure polyethylene, wherein a chlorinated low-pressure polyethylene which has been prepared by chlorinating low-pressure polyethylene in an aqueous or aqueous hydrochloric acid suspension is used, and wherein 0.01 to 2.0% by weight, relative to the low-pressure polyethylene, of a finely divided fluoropolymer have been added to the chlorination liquor, excluding chlorinated low-pressure polyethylenes which are obtained by chlorinating low-pressure polyethylene in the presence of 0.3 to 1.5% by weight of a polytetrafluoroethylene wax having a molecular weight of $10^4$ to $10^6$ and a particle size of 0.1 to 10.0 μm, and, additionally, also 0.01 to 1.1% by weight of silica which has been rendered hydrophobic and has a particle size of about 7 to 18 μm and 0.5 to 3.5% by weight of an inert inorganic additive having a high absorptive capacity for low-pressure polyethylene.

6. A shaped article produced from the thermoplastic composition according to claim 1.

7. A shaped article produced from the thermoplastic composition according to claim 5.

* * * * *